United States Patent Office 3,442,657
Patented May 6, 1969

3,442,657
PRESERVING HOPS BY DRYING AND MAINTAINING IN AN INERT ATMOSPHERE
Fritz Bonnet, Munich, Germany, and Robert Gustav Fromm, London, England, assignors to Joachim Fromm, Leopold Mayer-Bass GmbH, Munich-Pasing, Germany
No Drawing. Filed Mar. 24, 1965, Ser. No. 442,486
Claims priority, application Germany, July 3, 1964, B 77,525
Int. Cl. C12c *3/04, 3/02*
U.S. Cl. 99—50.5                5 Claims

ABSTRACT OF THE DISCLOSURE

Manufacturing of storable hops comprising drying the hops to a residual moisture content of not more than 5% by weight of water, placing the hops into hermetically sealable containers, evacuating the containers down to a residual oxygen content of less than 3.0% by volume, filling the containers with an inert gas and sealing them hermetically.

---

The invention relates to a process for the manufacture of storable hops.

Various processes for the manufacture of storable hops are known. In the oldest process for making a powdered hops preserve, which goes back to 1883, dried hops were subjected to grinding and subsequently stored in a container. Although subsequent efforts have been made to improve the methods of manufacturing and preserving read-to-use hops, the storage properties of the hops could not substantially be improved by these methods.

For instance, an attempt was made to improve the method of manufacturing the storable hops by comminuting and drying the hops in an inert gas containing little or no oxygen. The storage properties of the hops produced in this manner, however, could not be improved or only to a very small extent.

In order to preserve the valuable bitter substances of the hops during processing and substantially to eliminate the deleterious effects of oxygen and increased temperatures green hops (i.e. untreated hops) were frozen before mechanical comminution. If frozen hops are processed, the unfavorable effects of heat on the bitter substances can be increased by storing the comminuted material under an inert gas atmosphere. Low temperatures and freedom from oxygen are also used when making hops extract powder by an extratraction procedure, in order to avoid the undesirable oxidation of the bitter substances during extraction.

According to a prior suggestion made by the applicants, the storage properties of the valuable bitter substances can be increased by storing the comminuted material under an inert gas atmosphere, such as a carbon dioxide atmosphere.

In spite of the above-mentioned measures for improving the quality of storable hops, the present technical knowledge is insufficient to achieve the desired objective, which is to obtain hops that are storable for longer periods, without deteriorating and thus rendering ineffective the valuable components which determine the brewing value of the hops.

The object of the present invention is, therefore, to provide a process for the manufacture of storable hops which, after a long period, even after several years, can be taken from the storage container and still have almost the same brewing value as initially.

Since the bitter value is known to be a function of the percentages of alpha acid (humulon and of beta agents) (beta acid plus alpha and beta soft resins) the process according to the invention must be carried out in such a manner as to maintain these components substantially unchanged.

According to the invention, the above-described object is achieved by first drying hops to a residual moisture content of not more than 5% by weight of $H_2O$, placing the dried hops into hermetically sealable containers, evacuating the containers down to a residual oxygen content of less than 3% by volume, filling the containers with inert gas, and hermetically sealing them.

The required residual moisture content of between 0 and 5 percent by weight of $H_2O$ can be achieved by treating the hops on a dryer of known type. If necessitated by excessive humidity in the ambient atmosphere pre-dried air or other gas may be used during the final drying process. The drying can be carried out under an inert gas atmosphere using the procedure described in U.S. Patent No. 2,510,372. Such atmosphere, however, is not necessary with the process according to the present invention due to the subsequent treatment of the dry hops. After the desired degree of dryness has been achieved, the dry hops are filled into containers, and the containers are evacuated to the desired residual oxygen content, of not more than 3% by volume. Then, after admitting inert gases, such as carbon dioxide or nitrogen into the containers, the containers are hermetically sealed. Between the drying and filling steps the hops can also be comminuted (as by grinding to a particle size of between 2.0 and 0.1 millimeter) according to known procedures, in order to reduce the required storage volume.

An essential step in the process according to the invention comprises drying the hops to a residual moisture content of between 0 and 5 percent. Such thorough drying has not yet been considered by the experts, because these experts were of the opinion that this would degrade the chemical compounds determining the brewing value. This prejudice went so far that hops inadvertently dried to such low moisture content, were considered to be spoiled.

However, as can be seen from the following comparative examples, this assumption was wrong.

In order to show the technical progress which can be achieved with the new process according to the invention, reference is made to the results of the following comparative tests.

Example 1

In this example untreated hops having a residual moisture content of 11.7 percent by weight of water were filled into 1000 ml. cans at normal atmospheric pressure and temperature. The cans were hermetically sealed and were kept in a conditioning box having a temperature of 40° C. The cans were opened after four, eight and twelve weeks respectively, and the pertinent data were determined. The following Table I shows the values obtained before and after storage, respectively. The analytical accuracy in determining the bitter value was ±0.3%.

TABLE I.—UNTREATED HOPS

|  | Before storage | After storage in the incubation cupboard at 40° C. for— | | |
|---|---|---|---|---|
|  |  | 4 weeks | 8 weeks | 12 weeks |
| Residual moisture (percent by weight of $H_2O$) | 11.7 | 11.6 | 10.5 | 10.4 |
| Alpha acid (humulon), percent weight in dry substance | 5.7 | 3.1 | 1.9 | 0.9 |
| Beta components (beta acid, alpha+beta soft resins), percent by weight in dry substance | 8.0 | 9.5 | 10.5 | 10.4 |
| Hard resins, percent by weight in dry substance | 2.0 | 5.1 | 4.3 | 5.0 |
| Bitter value alpha+beta/9, in dry substance (according to Wöllmer) | 6.6 | 4.2 | 3.2 | 2.0 |

Example 2

The starting materials were the same untreated hops as used in Example 1. First, the residual moisture was reduced from 11.7 to 4.8 percent by weight. The treated hops were subsequently comminuted, packed (unpressed) in sealed cans of the same dimensions as the cans used in Example 1, and stored for four, eight and twelve weeks under the same conditions. Before hermetically sealing the cans, an oxygen content of 0.3 percent by volume was provided by evacuation, and the cans were filled with nitrogen as the inert gas. The following values were obtained.

TABLE II.—HOPS TREATED ACCORDING TO THE INVENTION

|  | Before storage | After storage in the incubation cupboard at 40° C. for— | | |
|---|---|---|---|---|
|  |  | 4 weeks | 8 weeks | 12 weeks |
| Residual moisture, $H_2O$, by percent of weight | 4.8 | 4.7 | 5.0 | 4.7 |
| Alpha acid (humulon), percent by weight in dry substance | 5.6 | 5.9 | 5.7 | 5.6 |
| Beta components (beta acid, alpha+beta soft resins), percept by weight in dry substance | 8.5 | 8.5 | 7.9 | 8.1 |
| Hard resins, percent by weight in dry substance | 1.8 | 2.0 | 3.0 | 2.5 |
| Bitter value alpha+beta/9, in dry substance | 6.5 | 6.8 | 6.6 | 6.5 |

The difference between column 1 and columns 2, 3 and 4 of Table II is within the accuracy of the analytical procedure used. The bitter value of the hops treated according to Example 2 of the present invention retained practically the same analytical accuracy within the total period under observation, under severe ageing conditions (i.e. a temperature of 40° C.).

The hitherto unattainable preservation of the bitter value which can be achieved according to the present invention may be ascribed to the combined effect of the forced drying of the freshly picked hops or of the additional drying of the hops already dried to normal or near-normal moisture-contents, having a residual moisture content of about 8 to 15%, to a residual moisture content of about 0 to 5%, and the evacuation down to a residual oxygen content of less than 3.0% by volume. Both process steps were unknown for the preparation of storable hops. The preservation of the brewing value, which can be achieved according to the present invention, however, will be achieved only by the combination of these two process steps.

The process according to the present invention, for the first time, permits long-term storage of hops substantially independently of room-temperature with hardly any deterioration of the brewing value. As is well-known, rises in temperature normally considerably decrease the brewing value of the hops.

Having thus described our invention what we claim as new and desire to secure by Letters Patent is:

1. A process for manufacturing storable hops capable of prolonged storage with no appreciable loss of the bitter substances therein which determine the brewing value of said hops, comprising the steps of drying hops to a residual moisture content of not more than 5% by weight of $H_2O$; placing said dried hops into hermetically sealable containers; evacuating said filled containers to a residual oxygen content of less than 3% by volume; filling said evacuated containers with an inert gas; and then hermetically sealing said containers with said inert gas contained therein.

2. A process according to claim 1, wherein the residual oxygen content is not more than 1%.

3. A process according to claim 2 in which the hops are comminuted after drying and before being filled into the container.

4. A process according to claim 3 in which the inert gas is nitrogen.

5. A process as claimed in claim 1 in which the hops are comminuted prior to drying.

References Cited

UNITED STATES PATENTS

| 75,203 | 3/1868 | Schoonmaker | 99—50.5 |
| 2,510,372 | 6/1950 | Bloxham | 99—50 |

FOREIGN PATENTS

| 2,083 | 6/1874 | Great Britain. |

RAYMOND N. JONES, *Primary Examiner.*

NORMAN ROSKIN, *Assistant Examiner.*